United States Patent [19]
Yamaya et al.

[11] Patent Number: 5,945,172
[45] Date of Patent: Aug. 31, 1999

[54] COATING AGENT COMPOSITION AND ARTICLES TREATED WITH SAID COMPOSITION

[75] Inventors: Masaaki Yamaya; Kazuharu Sato; Hiroaki Kizaki; Masahiro Furuya, all of Gunma-ken, Japan

[73] Assignee: Shin-Etsu Chemical Co., Ltd., Japan

[21] Appl. No.: 08/891,202

[22] Filed: Jul. 10, 1997

[30] Foreign Application Priority Data

Jul. 12, 1996 [JP] Japan .................................... 8-203139

[51] Int. Cl.⁶ ........................................................ C08J 7/04
[52] U.S. Cl. .............................. 427/503; 528/41; 522/91; 522/99; 525/100; 526/279; 556/440; 428/447
[58] Field of Search ................................ 528/41; 522/91, 522/99; 525/100; 526/279; 556/440; 428/447; 427/503

[56] References Cited

U.S. PATENT DOCUMENTS 4,336,309  6/1982  Jackel et al. ............................ 428/447
5,296,295  3/1994  Perkins et al. ........................... 428/412
5,378,734  1/1995  Inoue ......................................... 522/11
5,629,358  5/1997  Nagahata et al. ......................... 522/84
5,738,976  4/1998  Okinoshima et al. ................. 430/285.1

*Primary Examiner*—Melvyn I. Marquis
*Assistant Examiner*—Mark W. Milstead
*Attorney, Agent, or Firm*—Miller, White, Zelano & Branigan, P.C.

[57] ABSTRACT

A coating agent composition comprising an organopolysiloxane resin: with the organopolysiloxane resin having a number average molecular weight of at least 500 and acrylic or methacrylic functional group-attached silicon atoms in a proportion of 5 to 100 mole % to the total silicon atoms; and with the resin comprising units represented by formula $R^1LSiX_3$ in a proportion of 30 to 100 mole %, wherein $R^1$ is a hydrogen atom or a substituted or unsubstituted organic group having 1 to 18 carbon atoms and X is a hydroxyl group, a hydrolyzable group or a siloxane residue, provided that at least one X is a siloxane residue; wherein from 30 to 80 mole % of the $R^1SiX_3$ units are one silanol group-containing units represented by formula $R^1Si(OH)Y_2$ wherein Y is a siloxane residue.

15 Claims, 2 Drawing Sheets

COATING AGENT COMPOSITION AND ARTICLES TREATED WITH SAID COMPOSITION

FIELD OF THE INVENTION

The present invention relates to a coating agent composition and, more particularly, to a coating agent composition which can be cured by both irradiation with high-energy beams and condensation reaction between silanol groups and, when applied to the surface of a substrate, can form in a short time a highly hard, weather- and flame-resistant film.

BACKGROUND OF THE INVENTION

In place of conventional coating agents of organic resin type, coating agents of silicone resin type have recently been used for forming highly hard protective films on the surfaces of various kinds of materials represented by plastics, because the films formed therefrom have excellent properties, including (a) scratch resistance, (b) weather resistance and (c) flame resistance.

In those coating agents of silicone resin type, the condensation reaction between silanol groups, which enables the formation of siloxane linkage having excellent weather resistance, is adopted as a curing system for the purpose of forming highly hard, weather-resistant films.

However, the condensation reaction generally requires a long heating, so that those coating agents are in an uncured, tacky condition for a long time after application thereof. Thus, it becomes necessary to keep the applied coating agents in a clean space in order to eliminate a risk that foreign substances floating in the air, such as dust, are attached thereto before the curing is completed. In cases where materials for which high transparency is essential, such as optical materials, are treated with such coating agents, the lowering of yield and productivity becomes a problem.

Further, those coating agents have drawbacks of requiring not only a treatment of the substrate surface with a primer for achieving satisfactory adhesiveness but also low-temperature storage because of high reactivity of silanol groups contained therein.

On the other hand, as a means to heighten the productivity in the surface treatment of a substrate with a coating agent has been proposed a system in which an ultraviolet-responsive polyfunctional acrylic compound is incorporated in a coating agent to enable the coating agent to be rapidly cured by irradiation with ultraviolet rays. However, the skeletal structure of such a system is constituted mainly of organic elements, so that it is difficult for the system to attain hardness on the same level as a silicone type coating agent and, what is worse, the weather resistance of the cured system is insufficient. In other words, such a system has a draw back of lacking in suitability for a protective coating.

Further, the method of using a coating agent comprising a mixture of a silicone resin capable of causing polycondensation by heating and an organic material to be cured by undergoing polymerization upon irradiation with ultraviolet rays has been proposed (in Japanese Tokkai Hei 7-278328). The term "Tokkai" as used herein means an "unexamined published patent application".

According to such a method, the condensable silicone resin solution containing a ultraviolet-polymerizable organic compound is coated on a substrate, and dried. The coating thus formed is separated into two layers so that the surface layer is rich in the silicone resin. Then, the organic compound is polymerized with ultraviolet rays, and further the silicone resin is cured by heating. Therefore, the aforementioned method has an advantage in that it can save the step of applying a primer or the curing step of a primer can be shortened.

However, the foregoing method also has disadvantages in that the coating agent used therein has unsatisfactory stability upon storage in a solution state due to the presence of hydrolysis products of silane compounds, the thermal curing thereof requires a long time and the cured coating thereof has insufficient adhesiveness.

For the purpose of removing such disadvantages, instead of using the condensation reaction of silanol groups, it has been proposed to employ an UV irradiation-utilized curing system wherein the acrylic groups of a polyfunctional acrylic compound incorporated in a coating agent are utilized for the curing reaction by UV irradiation (Japanese Tokko Hei 1-55307, Japanese Tokko Hei 3-2168 and Japanese Tokko Sho 63-65115). The term "Tokko" as used herein means an "examined patent publication".

In such a system, however, rapid irradiation with UV light is used for curing a film of coating agent with consideration for productivity increase alone, so that a network of siloxane links cannot be formed to cause deficiency in hardness of the cured film.

With intention of heightening the hardness, on the other hand, if the condensation reaction of silanol groups is combined with the foregoing curing system, silane compounds are hydrolyzed in the presence of acid catalysts, similarly to the cases where organic solvents are present therein. However, the hydrolysis products obtained are unstable, or deficient in storage stability; as a result, the film formed is inferior in workability.

Thus, there has not yet been known any coating agent which not only forms in a short time a tack-free, hard film having excellent scratch resistance, weather resistance and flame resistance but also ensures a high yield, or excellent productivity and workability (storage stability in the form of solution).

SUMMARY OF THE INVENTION

As a result of our intensive studies of organopolysiloxane resins having acrylic or methacrylic (which is abbreviated as (meth)acrylic, hereinafter) functional groups and silanol groups, it has been found that desirable results can be obtained by using as a main component of a coating agent an organopolysiloxane resin in which not only a specified proportion of (meth)acrylic functional groups are present but also silanol groups are present in a specified proportion on the constitutional units having a particular structural formula in which only one of the substituents is a silanol group, thereby achieving the present invention.

Therefore, a first object of the present invention is to provide a coating agent composition which can form a hard coating having not only excellent scratch, weather and flame resistances but also high productivity and workability.

A second object of the present invention is to provide articles the surfaces of which are treated with the aforesaid coating agent composition.

The above-described objects of the present invention are attained with a coating agent composition comprising an organopolysiloxane resin: with the organopolysiloxane resin having a number average molecular weight of at least 500 and acrylic or methacrylic functional group-attached silicon atoms in a proportion of 5 to 100 mole % to the total silicon atoms; and with the resin comprising units represented by formula $R^1SiX_3$ in a proportion of 30 to 100 mole %, wherein $R^1$ is a hydrogen atom or a substituted or unsubstituted organic group having 1 to 18 carbon atoms and X is a hydroxyl group, a hydrolyzable group or a siloxane residue, provided that at least one X is a siloxane residue; wherein from 30 to 80 mole % of the $R^1SiX_3$ units are one silanol group-containing units represented by formula $R^1Si(OH)Y_2$ wherein Y is a siloxane residue.

DETAILED DESCRIPTION OF THE INVENTION

Figure 1:
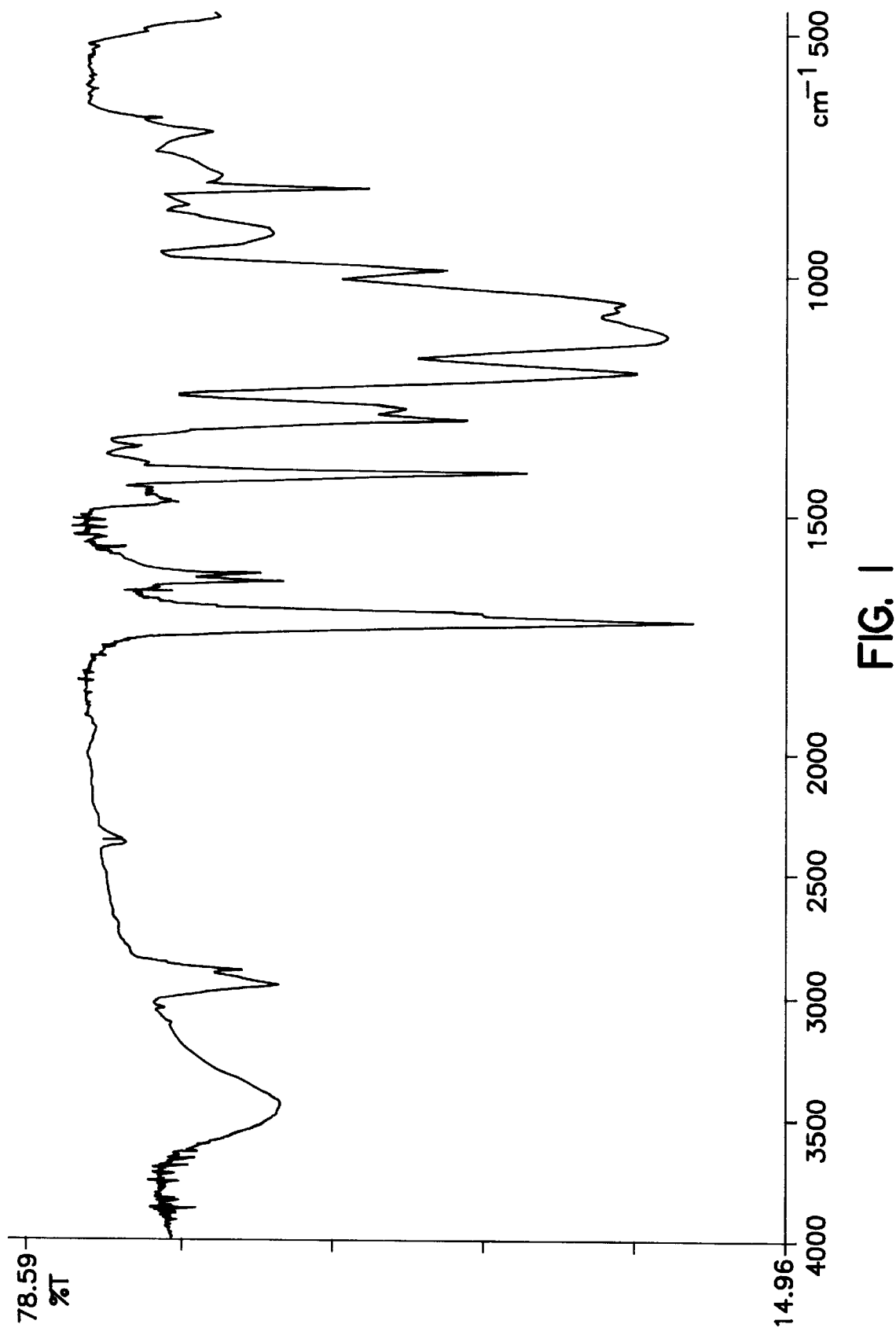
FIG. 1 is an IR spectrum of the organopolysiloxane resin produced in Example 1 using γ-acryloxypropyltrimethoxysilane as a starting material in the present invention.

The units of formula $R^1SiX_3$ contained in the present organopolysiloxane resin have an important role in the formation of a highly scratch-resistant, hard film because they form three-dimensional siloxane links (or a polysiloxane network of a high cross-linking degree) by the condensation reaction during the film formation of a coating agent according to the present invention. The present organopolysiloxane resin is required to have these units in a proportion of from 30 to 100 mole %, preferably from 40 to 100 mole %. When the proportion is less than 30 mole %, the coating cannot have high hardness due to insufficient cross-linking density therein.

In the present organopolysiloxane resin, $R^1SiX_2$ units having two organic substituents represented by $R^1$ may be introduced for the purpose of imparting pliability and flexibility to the coating; while $SiX_4$ units having no $R^1$ may be introduced for the purpose of imparting high hardness to the coating.

In the present units of formula $R^1SiX_3$, $R^1$ is a hydrogen atom or a substituted or unsubstituted organic group having 1 to 18 carbon atoms, and X is a hydroxyl group, a siloxane residue or a hydrolyzable group, provided that at least one of three X groups is a siloxane residue. Specific examples of a hydrolyzable group represented by X include a halogen atom such as chlorine atom, an alkoxy group such as methoxy, ethoxy, propoxy or isopropoxy group, an acyloxy group such as acetoxy group, and an amino group.

Specific examples of an organic group represented by $R^1$ include alkyl groups, such as methyl, ethyl, propyl, butyl, isobutyl, hexyl, decyl, octadecyl and cyclohexyl groups; alkenyl groups, such as a vinyl group; aryl groups, such as a phenyl group; groups formed by substituting halogens for a part or all of the hydrogen atoms attached directly to carbon atoms in the above-recited groups, such as trifluoropropyl, perfluorobutylethyl, perfluorooctylethyl, 3-chloropropyl and 2-(chloromethylphenyl)ethyl groups; groups having epoxy functional substituents, such as 3-glycidyloxypropyl, 2-(3,4-epoxycyclohexyl)ethyl, 5,6-epoxyhexyl and 9,10-epoxydecyl groups; amino-substituted groups, such as 3-aminopropyl, N-(2-aminoethyl) aminopropyl, 3-(N-phenylamino)propyl and 3-(dibutyl amino)propyl groups; groups having (meth)acrylic moieties, such as 3-methacryloxypropyl and 3-acryloxypropyl groups; sulfur-containing groups, such as 3-mercaptopropyl and 2-(4-mercaptomethylphenyl)ethyl groups; alkyl ether groups, such as polyoxyethyleneoxypropyl group; anionic groups, such as 3-hydroxycarbonylpropyl group; and groups having a quaternary ammonium salt structure, such as 3-tributylammonium propyl group.

In particular, it is preferable for $R^1$ to be an alkyl group when the present organopolysiloxane resin is used for the purpose of answering weather-resistance requirements.

Additionally, the siloxane residue is represented by $-OSi\equiv$ and attached to the silicon atom in $R^1SiX_3$ via the oxygen atom.

For forming a cured film which has excellent flexibility and good keeping quality as well as high hardness, the units of formula $R^1SiX_3$ are required to comprise the units characterized by their unique structure in which only one silanol group is present to ensure condensation activity and storage stability, or the silanol group-containing units of formula $R^1Si(OH)Y_2$ (Y: a siloxane residue), in a proportion of 30 to 80 mole %.

When the proportion of $R^1Si(OH)Y_2$ units is smaller than 30 mole %, the silicone resin obtained lacks in the absolute quantity of silanol groups to take part in the curing reaction, and thereby the cured coating comes to have insufficient hardness. On the other hand, when the proportion of those units is larger than 80 mole %, the polymerization degree cannot be heightened making it difficult to form a chain or cyclic structure; as a result, the cured coating becomes highly crystalline losing flexibility and, in analogy to conventional coating agents, the resultant coating agent comes to have low stability upon storage in the form of solution.

As described above, the organopolysiloxane resin as a main component of the present coating agent composition is characterized by having high stability in spite of its rich content of silanol groups.

The present silicone resin which has high stability although it is rich in silanol groups can be produced by the method described in detail below, wherein an organosilicon compound having three hydrolyzable groups undergoes hydrolysis and condensation reaction in the presence of a large excess of water without using any organic solvent, in contrast to hitherto known general methods. The following is an estimated reaction mechanism by which such a special structure is conferred on the present silicone resin in the processes of hydrolysis and condensation in an aqueous medium.

In the first step of the production method, an organosilicon compound is hydrolyzed to provide a monomeric compound having three silanol groups.

In general the silanol group has a polarized structure represented by formula (I);

$$\equiv Si^{\delta+}-O^{\delta-}-H^{\delta+} \quad (I)$$

and forms a hydrogen bond together with another silanol group or a solvent molecule having a hydroxyl group, such as water or an alcohol.

Water is generally a solvent having very high polarity, and combines with a silanol group to form a strong hydrogen bond. In a case where the condensation reaction is carried out in a large quantity of aqueous solution, stable hydrogen bonding between silanol groups and water inhibits the silanol groups from being condensed together; as a result, a large proportion of silanol groups remain uncondensed. Accordingly, the initial hydrolysis product having three silanol groups is highly soluble in water, so that it is completely dispersed and dissolved in water.

In the second step, the condensation of silanol groups proceeds gradually to allow a monomer to grow into an oligomer having a linear-chain structure, HO—[R$^1$Si(OH)—O—]$_n$—H. In proportion to the progress of the condensation reaction, the number of hydrophilic silanol groups are lessened, so that the hydrophilic property of a molecule as a whole is gradually lost. Thus, in order to retain solubility or dispersibility in water, each molecule tends to have a conformation which enables the full demonstration of its hydrophilic property (in other words, a conformation getting nearer to a cyclic form in which the silanol groups showing a hydrophilic property are directed outward so as to undergo strong hydration and the organic substituents having high hydrophobicity are directed inward so as to be wrapped in a molecular chain). In course of time, the condensation reaction is retarded since the silanol groups remaining on the siloxane chain of the oligomer have somewhat low reactivity due to a steric factor and the adjacent silanol groups turn to such a direction as to be kept away from each other.

In the third step subsequent to the aforementioned step, the condensation reaction between silanol groups still retaining high reactivity proceeds to form polymers having complex structures. For instance, the silanol groups present on the both ends of a molecular chain are condensed to form a cyclic compound, or the silanol groups present on one end of a molecular chain react with silanol groups present on other molecules to form a compound having a three-dimensional structure, or linear-chain oligomers are condensed to form a compound having a ladder structure. It can be thought that, since the silanol-rich organopolysiloxane produced therein can be present in a condition that its molecular chains are as well stretched out in the aqueous solution as in a good solvent solution, the intermolecular condensation has preference to the intramolecular condensation to increase the polymerization degree. The increase in polymerization degree brings a rapid lowering of the solubility in water. As a result, the condensation product sometimes precipitates as a consistent material in which water molecules are enclosed.

For heightening the hardness of a coated film by combining a siloxane linkage network with vinyl polymer chains, the organopolysiloxane resin used in the present invention requires to have in one molecule both (meth)acrylic functional substituent groups capable of causing vinyl polymerization by irradiation with ultraviolet rays or electron beams and substituent groups capable of undergoing cross-linking reaction, such as a silanol group and hydrolyzable groups represented by an alkoxy group.

The (meth)acrylic functional substituent groups introduced into the present organopolysiloxane resin have no particular limitation, but they may include a 3-(meth)acryloxypropyl group, a (meth)acryloxymethyl group, a 1,1-(meth)acryloxyundecyl group and so on.

The proportion of the silicon atoms to which the foregoing (meth)acrylic functional substituent groups are attached is required to be at least 5 mole %, particularly no lower than 10 mole %, to the total silicon atoms in the present organopolysiloxane resin.

When the aforesaid proportion is less than 5 mole %, the coating formed is insufficient in cross-linking density; as a result, it has low hardness and unsatisfactory scratch resistance. The coating formed heightens its strength with an increase beyond 5 mole % in the proportion, but lowers its flexibility, namely gets brittle, therewith. Therefore, the optimum proportion should be chosen. Also, insufficiency of the flexibility can be supplemented by the introduction of the units having the foregoing formula R$^1_2$SiX$_2$ wherein two R$^1$ groups may be the same or different and at least one R$^1$ group is a (meth)acrylic functional substituent group.

From the viewpoint of forming a protective coating, the organopolysiloxane resin used in the present invention is required to have a number average molecular weight of at least 500, preferably at least 600, particularly preferably from 1,000 to 10,000.

In a case where the number average molecular weight of a resin is less than 500, the resin is deficient in film formability; as a result, it becomes difficult to form a desired coating. In addition, the cyclic or linear-chain structures characteristic of an organopolysiloxane resin cannot be present in a cured film when the polymerization degree is too low; as a result, not only the flexibility and adhesiveness of the coating obtained are lowered but also it becomes difficult to ensure storage stability in a silicone resin solution.

Further, the method of producing an organopolysiloxane resin used as a main component in the present invention, which comprises hydrolysis (as the first step) and condensation reaction (as the second step), is illustrated in detail.

In the first hydrolysis step, water is added to at least one organosilicon compound represented by R$^2_n$SiZ$_p$ as a starting material without using any organic solvent, and stirred to make an aqueous dispersion. The dispersion is adjusted to pH 2–7 to cause hydrolysis reaction therein. In another manner, water adjusted to pH 2–7 is mixed with the aforesaid starting material to effect the hydrolysis. In this step, it is desirable that water be used in an amount of from 50 to 5,000 parts by weight per 100 parts by weight of organosilicon compound.

The R$^2$ groups in the aforesaid organosilicon compound have the same meaning as the R$^1$ group defined hereinbefore, provided that from 5 to 100 mole % thereof are (meth)acrylic functional groups. Z represents a hydrolyzable group, with specific examples including a halogen atom such as chlorine, an alkoxy group such as methoxy, ethoxy, butoxy and isopropoxy group, an acyloxy group such as acetoxy group, and an amino group. Although n and p are integers to satisfy the condition that n is 0, 1 or 2, p is 2, 3 or 4 and n+p is 4, it is further required to chose the starting material R$^2_n$SiZ$_p$ so that the R1SiX3 units be contained in a proportion of 30 to 100 mole %.

When the amount of water used in the hydrolysis step is less than 50 parts by weight, it often happens that the reactivity control of silanol groups as mentioned above becomes impossible due to shortage of water in the reaction system; while, when it is greater than 5,000 parts by weight, the condensation reaction in the second step is retarded due to a too low concentration of starting silane.

Since the aforementioned hydrolysis is apt to be accompanied with generation of some heat, it is desirable to perform the hydrolysis as the reaction system is cooled with water or ice.

In the foregoing hydrolysis reaction, the water solution is required to have a pH value ranging from 2 to 7, particularly from 3 to 6. This is because the stability of silanol group is very low under a strong acid or alkaline condition, or under the pH lower than 2 or higher than 7.

In the present invention, it is desirable that the hydrolysis reaction be accelerated by the use of a hydrolysis catalyst. The hydrolysis catalyst can be selected properly from known ones. In particular, it is preferred to use a catalyst showing the pH 2–7 as an aqueous solution. Appropriately, the hydrolysis catalyst is added in a proportion of 0.001 to 10 mole % per mole of hydrolyzable groups in the organosilicon compound used as a starting material.

Suitable examples of a hydrolysis catalyst include hydrogen halides, carboxylic acids, sulfonic acids, acidic or weakly acidic inorganic salts, and solid acids such as ion exchange resins. More specifically, hydrogen fluoride, hydrochloric acid, nitric acid, sulfuric acid, acetic acid, methanesulfonic acid, cation exchange resins having carboxylic or sulfonic acid groups at their surfaces, and organic acids represented by maleic acid and citric acid can be employed as the hydrolysis catalyst.

With respect to the organosilicon compound used as a (meth)acryloxy functional group-introducing source in the hydrolysis step, 3-(meth)acryloxypropyltrimethoxysilane, 3-(meth)acryloxypropyltriethoxysilane, 3-(meth)acryloxypropylmethyldimethoxysilane and 3-(meth)acryloxypropylmethyldiethoxysilane are specific examples thereof.

Specific examples of an organosilicon compound which can be used as an optional component in the hydrolysis step include methyltrimethoxysilane, methyltriethoxysilane, methyltriisopropoxysilane, methyltributoxysilane, methyltriisopropenoxysilane, methyltriacetoxysilane, methyltrichlorosilane, ethyltrimethoxysilane, ethyltriethoxysilane, ethyltriisopropoxysilane, propyltrimethoxysilane, propyltriethoxysilane, propyltriisopropoxysilane, butyltrimethoxysilane, hexyltrimethoxysilane, decyltrimethoxysilane, octadecyltrimethoxysilane, vinyltrimethoxysilane, vinyltriethoxysilane, vinylmethyldimethoxysilane, vinylmethyldiethoxysilane, vinylmethyldichlorosilane, 5-hexenyltrimethoxysilane, phenyltrimethoxysilane, phenyltriethoxysilane, phenyltrichlorosilane, phenylmethyldimethoxysilane, phenylmethyldiethoxysilane, phenylmethyldichlorosilane, 3-glycidoxypropyltrimethoxysilane, 3-glycidoxypropyltriethoxysilane, 3-glycidoxypropylmethyldimethoxysilane, 3-glycidoxypropylmethyldiethoxysilane, 3-aminopropyltrimethoxysilane, 3-aminopropyltriethoxysilane, 3-aminopropylmethyldimethoxysilane, 3-aminopropylmeythyldiethoxysilane, 3-(2-aminoethyl) aminopropyltrimethoxysilane, 3-mercaptopropyltrimethoxysilane, 3-mercaptopropyltriethoxysilane, 3-mercaptopropylmethyldimethoxysilane, 3-mercaptopropylmethyldiethoxysilane, tetramethoxysilane, tetraethoxysilane, tetrabutoxysilane, dimethoxydiacetoxysilane, tetrachlorosilane, dimethyldimethoxysilane, dimethyldiethoxysilane, dimethyldibutoxysilane, dimethyldiisopropenoxysilane, dimethyldichlorosilane, dimethyldiacetoxysilane, hexamethylcyclotrisilazane, ethylmethyldimethoxysilane, propylmethyldimethoxysilane, hexylmethyldimethoxysilane, cyclohexylmethyldimethoxysilane, decylmethyldimethoxysilane, diphenyldimethoxysilane, diphenyldiethoxysilane, diphenyldichlorosilane, and partial hydrolysis products of the above-cited silanes.

It is required to select the optional component from the organosilicon compounds as recited above so that 5–100 mole % of $R^2$ groups in the organosilicon compounds of formula $R^2_n SiZ_p$ used as starting material are (meth)acryloxy functional groups and the proportion of $R^1 SiX_3$ units in the organopolysiloxane resin produced is from 30 to 80 mole %.

As for Z as a hydrolyzable group, methoxy and ethoxy groups are preferred because they can ensure easy operation and easy removal of by-products in the hydrolysis step.

In the condensation reaction as the second step, the hydrolyzed organosilicon compounds are condensed in an aqueous medium whose main component is water in a substantial sense until the proportion of only one silanol group-containing unit $R^1Si(OH)Y_2$ reaches 30–80 mole % of the $R^1SiX_3$ units.

The condensation reaction is desirably a ripening reaction carried out taking 1 to 50 hours at room temperature or under heating to a temperature lower than 80° C. Under the reaction temperature higher than 80° C., the condensation reaction of silanol groups as well as hydrolysis reaction is promoted to tend to cause three-dimensional cross-linking; as a result, the desired organosiloxane resin often fails of production.

In cases where alkoxysilanes are used as the starting material in the first step, the hydrolysis and the condensation reaction can be accelerated by running the condensation reaction at a temperature lower than 80° C. under reduced pressure of 20–100 mmHg, because the alcohol or/and water produced by hydrolysis are distilled away.

When the thus obtained solution of an organopolysiloxane resin as hydrolytic condensation products is slightly cloudy, this cloudy solution is separated into two layers by being allowed to stand for a while. The upper layer is a layer of aqueous alcohol solution having a siloxane concentration lower than 5 weight %, and the lower layer is a layer containing a consistent organopolysiloxane resin and a small amount of water or an alcohol.

When the molecular weight of an organopolysiloxane produced is increased beyond 500, the proportion of hydrophilic silanol groups therein is reduced to some extent and thereby its solubility in water is lowered. In some cases, therefore, the produced organopolysiloxane resin precipitates. The precipitated organopolysiloxane product may be separated, and dissolved again by adding thereto an organic solvent or a polyfunctional (meth)acrylic compound which can be used in combination; or it may be isolated by the extraction with an organic solvent slightly soluble in water.

The present coating agent composition is a composition comprising the aforementioned organopolysiloxane resin diluted with or dissolved in water and/or an organic solvent. Specific examples of such an organic solvent include ketones, such as methyl ethyl ketone (MEK), methyl isobutyl ketone (MIBK) and acetylacetone; alcohols, such as methanol, ethanol, isopropyl alcohol, n-butanol, isobutanol, t-butanol, t-amyl alcohol butyl cellosolve, 3-methyl-3-methoxybutanol, diacetone alcohol (DAA); ethers, such as propylene glycol monomethyl ether, dipropylene glycol monomethyl ether and diisopropyl ether; and esters, such as ethyl acetate and isobutyl acetate.

The present coating agent composition can further comprise a silicon atom-free, polyfunctional (meth)acrylic compound which functions as a cross-linking agent to give improved adhesiveness to the composition.

Such a compound does not have any other particular limitation so far as at least two (meth)acrylic functional groups are present therein.

Specific examples thereof include difunctional (meth) acrylates, such as ethylene glycol di(meth)acrylate, 1,3-butanediol di(meth)acrylate, 1,6-hexanediol di(meth) acrylate, 1,9-nonanediol di(meth)acrylate, neopentyl glycol di(meth)acrylate, diethylene glycol di(meth)acrylate, triethylene glycol di(meth)acrylate, polyethylene glycol di(meth) acrylate, propylene glycol di(meth)acrylate, polypropylene glycol di(meth)acrylate, 2-hydroxy-1,3-di(meth)acryloxypropane and 2,2-bis[4-((meth)acryloxyethoxy) phenyl]propane; trifunctional (meth)acrylates, such as trimethylolpropane tri(meth)acrylalte, pentaerythritol tri(meth) acrylate and tris[(meth)acryloxyethyl]isocyanurate; and tetrafunctional (meth)acrylates, such as pentaerythritol tetra (meth)acrylate.

In addition, any compound which can be polymerized by the irradiation with high-energy beams to function as a cross-linking agent, including divinylbenzene, can be employed.

The silicon atom-free polyfunctional (meth)acrylic compound is used in an amount of at most 500 parts by weight, particularly at most 200 parts by weight, per 100 parts by weight of organopolysiloxane resin used in the present invention. When such a compound is used in an amount greater than 500 parts by weight, the properties characteristic of silicones are lost to fail in obtaining advantages such as high weather resistance and high hardness.

Furthermore, it is desirable for the present coating agent composition to contain a photopolymerization initiator which has an ability to produce radicals by absorbing high-energy beams, such as ultraviolet rays, electron beams and radiations, and thereby to polymerize the unsaturated double bonds of (meth)acrylic groups and the like present in the composition. The suitable amount of a photopolymerization initiator added is from 0.01 to 10 parts by weight, particularly from 0.5 to 1 part by weight, per 100 parts by weight of organopolysiloxane resin as the main component of the present composition.

When the amount added is less than 0.01 part by weight, the curing of the composition becomes too slow; while, when it is increased beyond 10 parts by weight, the cured coat is sometimes softened.

The photopolymerization initiator usable in the present invention has no particular limitation, so it can be selected properly from known ones. Specific examples thereof include benzoin and derivatives thereof, such as benzoin ethyl ether, benzoin propyl ether and benzoin isopropyl ether; 2-hydroxy-2-methylpropane-1-one derivatives, such as 2-hydroxy-2-methyl-1-phenylpropane-1-one and 1-(4-isopropylphenyl)-2-hydroxy-2-methylpropane-1-one; acetophenone derivatives, such as dimethoxyacetophenone and diethoxyacetophenone; benzophenone; 4,4'-bis (dimethylamino)benzyldimethylketal; and 2,4,6-trimethylbenzoyldiphenylphosphine oxide.

For the purpose of rapidly proceeding the condensation of silanol groups, it is desirable to add a condensation catalyst to the present coating agent composition. The condensation catalyst suitable for such a purpose can be chosen properly from known ones.

Specific examples of a condensation catalyst which can be used include basic compounds, such as lithium hydroxide, sodium hydroxide, potassium hydroxide, sodium methylate, sodium acetate, sodium formate, n-hexylamine, tributylamine and diazabicycloundecene; metal-containing compounds, such as tetraisopropyl titanate, tetrabutyl titanate, aluminum triisobutoxide, aluminum triisopropoxide, aluminum acetylacetonate, aluminum perchlorate, aluminum chloride, cobalt octylate, cobalt acetylacetonate, zinc octylate, zinc acetylacetonate, iron acetylacetonate, tin acetylacetonate, tibutyltin octylate and dibutyltin laurylate; and acidic compounds, such as p-toluenesulfonic acid and trichloroacetic acid.

The appropriate amount of a condensation catalyst added is from 0.01 to 10 parts by weight, particularly from 0.1 to 5 parts by weight, per 100 parts by weight of the organopolysiloxane resin as the main component of the present composition. When the amount added is less than 0.01 part by weight, the decrease in the curing speed tends to occur to make it impossible to attain satisfactory productivity; while, when it is more than 10 parts by weight, the storage stability of hydrolysis products of silanes is liable to be lowered.

In addition to the above-recited ingredients, fine grains of a metal oxide can be added to the present coating agent composition for the purposes of enhancing hardness and scratch resistance of the resultant cured coat, and further imparting optical functions, such as a high refractive index, to the resultant cured coat. The metal oxides used for these purposes can be chosen properly from known ones. Specific examples thereof include silica, alumina, titanium oxide ($TiO_2$), cerium oxide ($CeO_2$), tin oxide ($SnO_2$), zirconium oxide ($ZrO_2$), antimony oxide ($Sb_2O_5$), iron oxide ($Fe_2O_3$), iron oxide- or zirconium oxide-doped titanium oxide, the oxides of rare earth metals and mixtures of two or more of the above-recited oxides. Of these metal oxides, silica is especially suitable for conferring excellent scratch resistance on the cured coat. It is desirable for these metal oxides to be added in an amount of from 5 to 500 parts, particularly from 50 to 300 parts by weight, per 100 parts by weight of the organopolysiloxane resin.

To the present coating agent composition, it is desirable to add a dispersion medium. As for the dispersion medium, a polar organic solvent or an aqueous dispersion medium is used to advantage. In particular, water, a lower alcohol, such as methanol, ethanol, isopropyl alcohol, n-butanol or isobutanol, methyl ethyl ketone (MEK), methyl isobutyl ketone (MIBK) and dimethylformamide (DMF) are suitably used, because they ensure high stability in the sol state of the composition and it is easy to obtain them.

In order to further heighten the stability of silanol groups, it is desired that the pH of the present coating agent composition be adjusted to the range of 3 to 6. As a buffer for the pH adjustment, the combination of an acid with a basic compound can serve. For instance, the combination of acetic acid with sodium acetate or the combination of disodium hydrogen phosphate with citric acid can be employed.

To the present coating agent composition also, organic resins, pigments, dyes and leveling agents can be added for the purpose of giving excellent properties to the cured coat, various known ultraviolet absorbents and hindered amines for stabilization to light can be added for the purpose of imparting excellent weather resistance to the cured coat, and storage stabilizers and the like can be added for the purpose of attaining sufficient solution stability.

In forming a cured coat from a coating agent composition according to the present invention, the following operations are made:

At first, the present coating agent composition is coated on a substrate. In this step, other additives, including a diluent, a curing catalyst and so on can be added to the coating agent composition.

Next, the coat on the substrate is cured by the irradiation with high-energy beams, such as ultraviolet rays or electron beams, until it becomes free from tackiness. Prior to the irradiation, the volatile components such as solvents may be removed from the coat by drying with air or short-time heating.

Finally, the coat rendered tack-free is further cured by heating; as a result, the silanol groups undergo condensation to confer higher hardness on the cured coat.

The coating agent in accordance with the present invention can be applied to a substrate using a method chosen properly from known coating methods. For instance, any of general methods, including a flow coating method, a dip coating method, a spray coating method, a spin coating method and a roll coating method, can be employed. The appropriate thickness of the coat applied to the substrate surface is from 0.5 to 5 μm.

For curing the coat, it is desirable that the irradiation amount of high-energy beams, such as ultraviolet rays or electron beams, be from 20 to 200 W/cm² and the irradiation time be from 5 to 600 seconds.

In the curing step after the irradiation with high-energy beams, it is desirable for the coat to undergo thermal treatment at a temperature of from 30° C. to 250° C. for a period of 5 to 120 minutes. In particular, the thermal treatment at a temperature of from 60° C. to 150° C. is preferable from the viewpoint of achieving both reduction in curing time and prevention against deterioration of the substrate.

The substrate to which the present coating agent composition is applied has no particular restriction. Suitable examples thereof include plastic moldings, wood articles, ceramics, glass products, metal products and the products of a composite material of two or more thereof.

The coating agent in accordance with the present invention can be obtained by diluting with or dissolving in water and/or an organic solvent, such as isobutyl acetate, the organopolysiloxane resin which is produced by firstly hydrolyzing the organosilicon compound of formula, $R^2_n SiZ_p$, defined hereinbefore in an aqueous solution and then condensing the hydrolysis products until the condensation product comes to have a molecular weight of at least 500, the proportion of $R^1 SiX_3$ units therein reaches 30 to 100 mole %, and the only one silanol group-containing units of formula, $R^1 Si(OH)Y_2$, defined hereinbefore comes to occupy from 30 to 80 mole % of the $R^1 SiX_3$ units.

The thus obtained coating agent is applied to the cleaned surface of a substrate, e.g., plastic moldings, wood products, ceramics, glass and metal products, then irradiated with high-energy beams to cause a curing reaction through polymerization of (meth)acrylic groups, and further heated to cause the other curing reaction through condensation of silanol groups; thereby providing the intended articles which are covered with the cured film having high hardness and excellent weather resistance.

The present coating agent composition not only can provide a cured coat having excellent scratch resistance, adhesiveness, weather resistance, flame resistance, storage stability and flexibility, but also ensures high productivity and easy operation. More specifically, the present coating agent enables the formation of a tack-free coat only by undergoing the irradiation with high-energy beams and, what is more, can be subjected to a double-cure treatment in which a low-temperature curing step is introduced. Thus, it becomes easy to form a coat which is highly hard, and that is rich in flexibility, on the surface of a plastic molding, a wood product, a ceramic, a glass product or a metal product.

The present invention will now be illustrated in greater detail by reference to the following examples. However, the invention should not be construed as being limited to these examples. Additionally, unless otherwise noted, all "parts" and all "%" in the following description are by weight.

EXAMPLES 1 TO 7 AND COMPARATIVE
EXAMPLES 1 AND 2

In a 2-liter flask, 900 g (50 moles) of water and each set of starting materials set forth in Table 1-1 in the total amount of 2.0 moles were mixed at room temperature. Thereto, 180 g (10 moles) of a 0.05 N water solution of hydrochloric acid was added dropwise over a 30-minute period while cooling the resultant solution with an ice bath, and thereafter the resultant mixture was stirred for 2 hours at room temperature, thereby completing the hydrolysis.

Then, the methanol produced by the hydrolysis and water were evaporated at 70° C. under reduced pressure to condense the hydrolysis product until the product weight was reduced to 85% of the initial weight. Thus, the solution almost free from methanol was obtained. This solution was separated into two layers by night-and-day standing and yielded a consistent organopolysiloxane resin precipitate. Thereto was added 400 g of MIBK, and the water layer thus separated as a lower layer was removed. The resultant MIBK layer was adjusted so as to have a nonvolatile matter concentration of 30% (105° C./3 hours). Thus, a colorless transparent organopolysiloxane liquid having a number average molecular weight as shown in Table 1-2 was obtained.

As a representative of the organopolysiloxane resin solutions produced above, the organopolysiloxane resin solution obtained in Example 1 (wherein γ-acryloxypropyltrimethoxysilane was used as the organosilicon compound) was selected, and a thin coat was formed by applying this representative solution to a NaCl disk and evaporating the solvent, and then its IR spectrum (shown in FIG. 2) was measured. Therein, characteristic absorption bands were observed at the following positions:

| | |
|---|---|
| 1. 912 cm⁻¹ and 991 cm⁻ | (C=C) |
| 2. 1,055 cm⁻¹ and 1,124 cm⁻¹ | (≡Si-O-Si≡) |
| 3. 1,724 cm⁻¹ | (C=C-C(=O)-) |
| 4. 3,432 cm⁻¹ | (≡Si-OH) |

On the other hand, the absorption in the vicinity of 2,850 cm⁻¹ attributed to the presence of a methoxy group was not observed, thereby it was confirmed that the methoxy groups were completely consumed (See FIG. 1).

Figure 2:
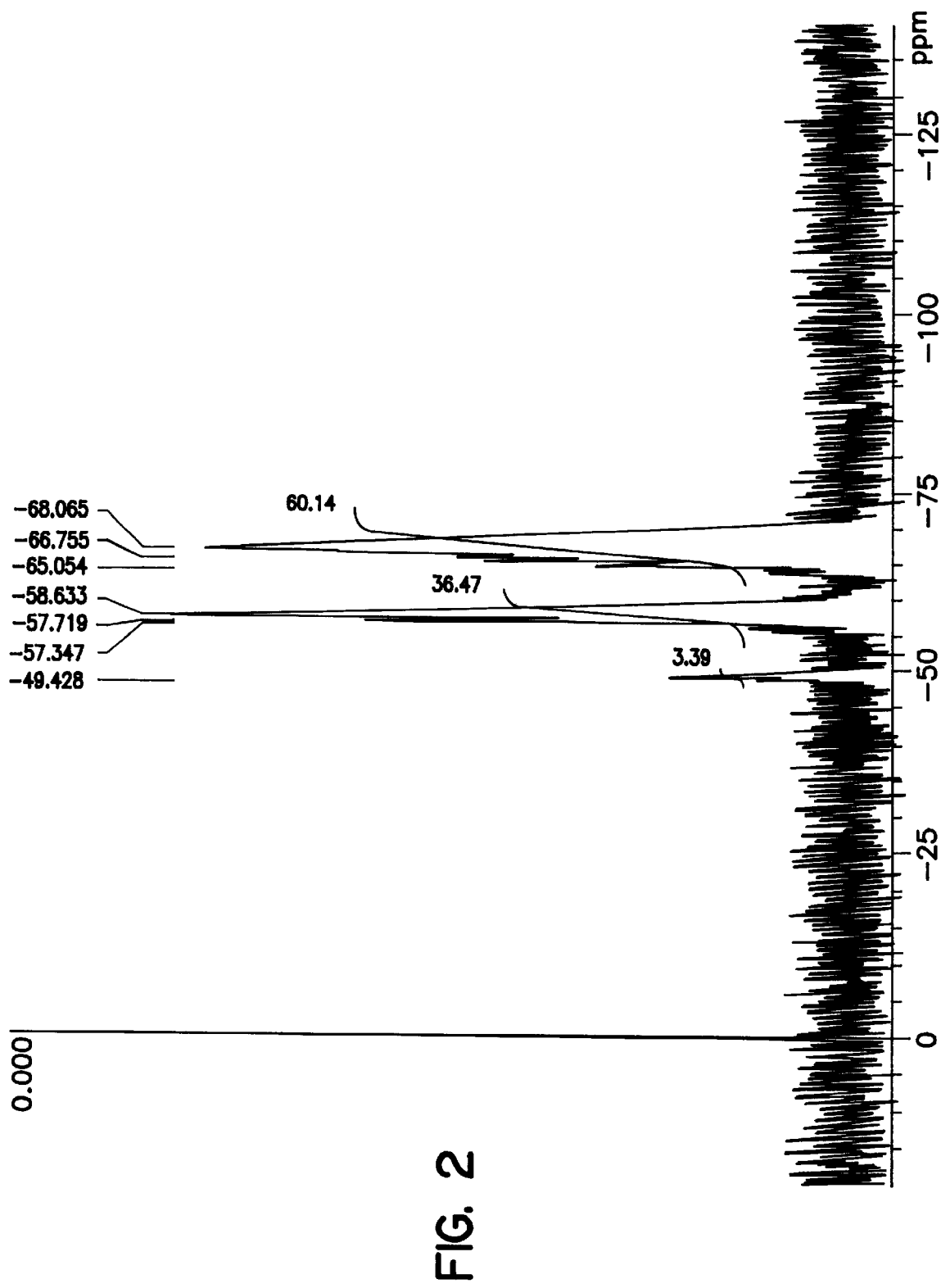
FIG. 2 is a $^{29}Si$ NMR spectrum of the organopolysiloxane resin produced in Example 1 using y-acryloxypropyltrimethoxysilane as a starting material in the present invention.

Further, the ²⁹Si-NMR spectrum of this siloxane resin solution was measured, which is shown in FIG. 2, and the signals observed therein are assigned as follows:

| Chemical shift value | Corresponding Constitutional Unit |
|---|---|
| (a) δ = −40 ~ −41 ppm | $R^1$-Si(OH)$_3$ |
| (b) δ = −49 ~ −50 ppm | $R^1$-Si(O-Si≡)(OH)$_2$ |
| (c) δ = −57 ~ −59 ppm, | $R^1$-Si(O-Si≡)$_2$(OH) |
| (d) δ = −66 ~ −70 ppm, | $R^1$-Si(O-Si≡)$_3$ |

By these spectral analysis results, it was confirmed that the monomeric RSi(OH)$_3$ was nearly absent in the organopolysiloxane resin solution obtained and the silane compound used as the starting material was almost completely converted into oligomeric silicone compounds.

Further, the proportion (mole %) of (meth)acrylic functional group-containing Si units in the organopolysiloxane resin, the proportion (mole %) of $R^1 SiX_3$ units in the organopolysiloxane resin and the proportion of $R^1$—Si(O—Si≡)$_2$(OH) units to the total $R^1 SiX_3$ units are summarized in Table 1-2.

Each of the resin solutions obtained above in an amount of 100 parts was admixed with 1 part of 2-hydroxy-2-methyl-1-phenylpropane-1-one and 0.2 parts of aluminum acetylacetate to prepare a coating solution. Each of the coating solutions thus obtained was coated at once on a polished clean steel plate by means of a bar coater (No. 20) and air-dried for 10 minutes.

Each of the thus formed coats was exposed to ultraviolet rays for 30 seconds by means of a 80 W/cm$^2$ high-pressure mercury lamp placed at a distance of 8 cm from the steel plate, and then examined as to whether it had tackiness or not. Further, the hardness of the thus ultraviolet-cured coat was evaluated by the pencil hardness measured in accordance with JIS-K-5400. Furthermore, the storage stability of each coating solution was judged by whether or not the pencil hardness of the ultraviolet-cured coat was reproduced by using the coating solution stored for 7 days at 40° C.

After irradiation with ultraviolet rays, each of the ultraviolet-cured coats obtained using the fresh coating solutions was further cured by 30-minute heating at 80° C., and examined again for the pencil hardness.

The evaluation results are set forth in Table 1-2.

COMPARATIVE EXAMPLE 3

An organopolysiloxane resin was produced in the same manner as in Example 1, except that the hydrolysis was carried out using toluene as the solvent in place of water, the hydrolysis products were ripened for 5 hours at 80° C., the hydrochloric acid used as the catalyst was neutralized by sodium hydrogen carbonate, the excess water was removed by azeotropic dehydration, the salt yielded by neutralization was filtered out, and then the nonvolatile matter concentration was adjusted to 30% by the use of MIBK. The thus obtained organopolysiloxane resin was evaluated in the same ways as mentioned above.

COMPARATIVE EXAMPLE 4

A 30% organopolysiloxane resin solution was produced in the same manner as in Example 1, except that the hydrolysis was carried out using methanol as the solvent in place of water while cooling with ice and the hydrolysis products were ripened for 2 hours at room temperature, and evaluated in the same ways as mentioned above.

TABLE 1-1

| Proportions (mole) of Organosilicon Compounds mixed | Example | | | | | | | Comparative Example | | | |
|---|---|---|---|---|---|---|---|---|---|---|---|
| | 1 | 2 | 3 | 4 | 5 | 6 | 7 | 1 | 2 | 3 | 4 |
| γ-acryloxypropyltrimethoxysilane | 2.0 | — | 1.0 | 0.2 | 0.6 | 0.8 | — | 0.05 | — | 1.0 | 1.0 |
| γ-acryloxypropylmethyldimethoxysilane | — | — | — | — | 1.2 | — | 0.6 | — | 0.4 | — | — |
| γ-methacryloxypropyltrimethoxysilane | — | 2.0 | — | — | — | — | 0.2 | — | — | — | — |
| γ-methacryloxypropylmethyldimethoxysilane | — | — | — | — | — | 0.2 | — | — | — | — | — |
| methyltrimethoxysilane | — | — | 1.0 | 1.6 | — | — | 1.0 | 1.75 | — | 1.0 | 1.0 |
| phenyltrimethoxysilane | — | — | — | — | — | 0.7 | — | — | — | — | — |
| tetramethoxysilane | — | — | — | 0.2 | 0.2 | — | — | 0.2 | 0.2 | — | — |
| dimethyldimethoxysilane | — | — | — | — | — | — | — | — | 1.4 | — | — |
| γ-glycidoxypropyltrimethoxysilane | — | — | — | — | — | 0.3 | — | — | — | — | — |
| γ-mercaptopropyltrimethoxysilane | — | — | — | — | — | — | 0.2 | — | — | — | — |

TABLE 2

| | Example | | | | | | Comparative Example | |
|---|---|---|---|---|---|---|---|---|
| | 8 | 9 | 10 | 11 | 12 | 13 | 5 | 6 |
| Proportions (parts by weight) of Ingredients in Coating Agent | | | | | | | | |
| silicone resin solution produced in Example 1 | 100 | — | — | — | — | — | — | — |
| silicone resin solution produced in Example 3 | — | 100 | 100 | 100 | 100 | 100 | 100 | 100 |
| tris(acryloxyethyl) isocyanurate | — | — | — | — | 10 | — | — | — |
| pentaerythritol triacrylate | 10 | 10 | 20 | 50 | — | — | 10 | 10 |
| 2-hydroxy-2-methyl-1-phenylpropane-1-one | 1 | 1 | 1 | 1 | 1 | 1 | — | 1 |
| aluminum acethylacetonate | 0.2 | 0.2 | 0.2 | 0.2 | 0.2 | 0.2 | 0.2 | — |
| Disappearance of Tackiness after Ultraviolet Irradiation | ○ | ○ | ○ | ○ | ○ | ○ | X | ○ |
| Ultraviolet-cured coat | | | | | | | | |
| scratch resistance (#0000 steel wool test) | ○ | ○ | ○ | ○ | ○ | ○ | X | Δ |
| Adhesiveness (cross-cut peeling test) | 100/100 | 100/100 | 100/100 | 100/100 | 100/100 | 98/100 | 55/100 | 80/100 |
| Ultraviolet-and Heat cured coat | | | | | | | | |
| scratch resistance (#0000 steel wool test) | ○ | ○ | ○ | ○ | ○ | ○ | Δ | Δ |
| Adhesiveness (cross-cut peeling test) | 100/100 | 100/100 | 100/100 | 100/100 | 100/100 | 100/100 | 100/100 | 100/100 |

○: distinctly good, Δ: not too bad, X: bad

Table 1-1 and Table 1-2 indicate that the coating solutions according to the present invention had properties well-suited for a coating agent; while the coating solution of Comparative Example 1, wherein the content of acrylic groups in its base resin was low, failed in providing a tack-free coat by the irradiation with ultraviolet rays, the coating solution of Comparative Example 4, wherein the base resin had a low polymerization degree due to the low-temperature hydrolysis, were poor in storage stability, and the coating solution of Comparative Example 2, wherein the content of $R^1SiX_3$ units was low, and the coating solution of Comparative Example 3, wherein the base resin had a low proportion of $R^1Si(OH)Y_2$ units although it had a high molecular weight, provided cured coats inferior in hardness. In other words, all the comparative coating solutions have proved to be inadequate for a coating agent.

EXAMPLES 8 TO 14 AND COMPARATIVE EXAMPLES 5 AND 6

Coating solutions were prepared by mixing the organopolysiloxane resin solution obtained in Example 1 or 3 with 2-hydroxy-2-methyl-1-phenylpropane-1-one, aluminum acetylacetonate and the polyfunctional acrylic compounds shown in Table 2 in their respective amounts set forth in Table 2. Each of the coating solutions thus obtained was coated on a polished clean polycarbonate plate by means of a bar coater (No. 20) and air-dried for 10 minutes.

Each of the thus formed coats was exposed to ultraviolet rays for 30 seconds by means of a 80 W/cm² high-pressure mercury lamp placed at a distance of 8 cm from the polycarbonate plate, and further thermally cured by 30-minute heating at 80° C., if needed. The thus obtained coats were each examined for the extent of scratches which the coat surface received by moving thereon #0000 steel wool back and forth for 50 times, thereby evaluating the scratch resistance. In addition, the adhesiveness of each coat was judged as follows: each cured coat was cut crosswise with a knife to form 10×10 sections, and thereto an adhesive tape (Cellotape, trade name, produced by Nichiban Co., Ltd.) was applied. Then, the adhesive tape was peeled away therefrom, and the number of sections remaining unpeeled was counted. The results obtained are shown in Table 2.

As can be seen from Table 2, the cured coats formed from the coating solutions prepared respectively in Comparative Example 5, wherein no photopolymerization initiator was used, and Comparative Example 6, wherein no catalyst for silanol condensation was used, were inferior in hardness due to insufficient cross-linking density, so that they failed in getting satisfactory scratch resistance. In other words, the comparative coating solutions have proved inadequate for a coating agent.

What is polysiloxane claimed is:

1. A coating agent composition comprising an organopolysiloxane resin: said resin having a number average molecular weight of at least 500 and acrylic or methacrylic functional group-attached silicon atoms in a proportion of 5 to 100 mole % to the total silicon atoms; and said resin comprising units represented by formula $R^1SiX_3$ in a proportion of 30 to 100 mole %, wherein $R^1$ is a hydrogen atom or a substituted or unsubstituted organic group having 1 to 18 carbon atoms and X is a hydroxyl group, a hydrolyzable group or a siloxane residue, provided that at least one X is a siloxane residue; wherein 30 to 80 mole % of said $R^1SiX_3$ units are one silanol group-containing units represented by formula $R^1Si(OH)Y_2$, wherein Y is a siloxane residue.

2. A coating agent composition according to claim 1, wherein the acrylic functional group is a group selected from the class consisting of a 3-acryloxypropyl group, a 3-methacryloxypropyl group, an acryloxymethyl group, a methacryloxymethyl group, a 1,1-acryloxyundecyl group and a 1,1-methacryloxyundecyl group.

3. A coating agent composition according to claim 1, wherein the organic group as $R^1$ is a group selected from the class consisting of an unsubstituted alkyl group, a halogen-substituted alkyl group, an epoxy-substituted alkyl group, an amino-substituted alkyl group, an aryloxy-substituted alkyl group, a methacryloxy-substituted alkyl group, a mercapto-substituted alkyl group, an alkenyl group and an aryl group.

4. A coating agent composition according to claim 1, wherein the hydrolyzable group as X is a group selected from the class consisting of a halogen atom, an alkoxy group, an acyloxy group and an amino group.

5. A coating agent composition according to claim 1, wherein the number average molecular weight of the organopolysiloxane resin is from 600 to 10,000.

6. A coating agent composition according to claim 1, further comprising a photopolymerization initiator in an amount of from 0.01 to 10 parts by weight per 100 parts by weight of said organopolysiloxane resin.

7. A coating agent composition according to claim 1, further comprising a condensation catalyst in an amount of from 0.01 to 10 parts by weight per 100 parts by weight of said organopolysiloxane resin.

TABLE 1-2

| | Example | | | | | | | Comparative Example | | | |
| --- | --- | --- | --- | --- | --- | --- | --- | --- | --- | --- | --- |
| | 1 | 2 | 3 | 4 | 5 | 6 | 7 | 1 | 2 | 3 | 4 |
| Number Average Molecular Weight | 1500 | 1300 | 1100 | 800 | 1000 | 600 | 1000 | 1000 | 1300 | 2000 | 400 |
| Proportion (mole %) of (Meth)acrylic Functional Group-containing Si Units in Resin | 100.0 | 100.0 | 50.0 | 10.0 | 90.0 | 50.0 | 40.0 | 2.5 | 20.0 | 50.0 | 50.0 |
| Proportion (mole %) of $R^1SiX_3$ Units in Resin | 100.0 | 100.0 | 100.0 | 90.0 | 30.0 | 90.0 | 70.0 | 90.0 | 0.0 | 100.0 | 100.0 |
| Proportion (mole %) of $R^1Si(OH)Y_2$ Units to Total $R^1SiX_3$ Units | 36.5 | 41.0 | 48.5 | 58.5 | 33.5 | 71.0 | 42.0 | 43.0 | 31.0 | 17.0 | 57.0 |
| Storage Stability of Solution (40° C. × 7 days) | ◯ | ◯ | ◯ | ◯ | ◯ | ◯ | ◯ | X | ◯ | ◯ | ◯ |
| Disappearance of Tackiness after Ultraviolet Irradiation | ◯ | ◯ | ◯ | ◯ | ◯ | ◯ | ◯ | X | ◯ | ◯ | |
| Pencil Hardness of Coat cured by Ultraviolet Irradiation | 7H | 6H | 4H | 2H | 5H | 4H | 4H | — | 2H | 4H | 4H |
| Pencil Hardness of Coat cured by Ultraviolet Irradiation plus Healing | 8H | 8H | 8H | 8H | 8H | 8H | 8H | 6H | 4H | 5H | 8H |

◯: distinctly good, Δ: not too bad, X: bad

8. A coating agent composition according to claim 6, further comprising a condensation catalyst in an amount of from 0.01 to 10 parts by weight per 100 parts by weight of said organopolysiloxane resin.

9. An article having a substrate and a coat formed by surface-treatment with a coating agent composition according to claim 1.

10. An article according to claim 9, wherein the substrate is coated with the coating agent composition and the composition coated is cured through the polymerization of the acrylic or methacrylic groups caused by irradiation with high-energy beams and further cured through the condensation of the silanol groups by heating.

11. A method of making an article which has a cured coat on a substrate, wherein the substrate is coated with a coating agent composition according to claim 1 and the composition coated is cured through the polymerization of the acrylic or methacrylic groups caused by irradiation with high-energy beams and further cured through the condensation of the silanol groups by heating.

12. The coating agent composition of claim 1, wherein the resin further comprises units of the formula $R^1{}_2SiX_2$ where $R^1$ and X are as defined.

13. The coating agent composition of claim 1, wherein the resin further comprises units of the formula $SiX_4$ where X is as defined.

14. The coating agent composition of claim 1, wherein the $R^1$ groups are alkyl groups.

15. The coating agent composition of claim 1, which is prepared by a process comprising hydrolyzing and condensing an organosilicon compound having three hydrolyzable groups in the presence of 50 to 5000 parts by weight of water per 100 parts by weight of the organosilicon compound, in the absence of an organic solvent and while adjusting the pH to 2–7.

* * * * *